United States Patent [19]

Erdtmann et al.

[11] Patent Number: 6,046,253
[45] Date of Patent: Apr. 4, 2000

[54] DISPERSANT FOR INK JET INK

[75] Inventors: David Erdtmann, Rochester, N.Y.;
Elizabeth G. Burns, Salem, N.H.;
John Dicillo, Rochester, N.Y.

[73] Assignee: Eastman Kodak Company, Rochester, N.Y.

[21] Appl. No.: 09/151,121

[22] Filed: Sep. 10, 1998

[51] Int. Cl.$^7$ .................. C09D 11/10; C09D 167/02; C08G 63/688; C08G 63/127; C08G 63/181

[52] U.S. Cl. .................. 523/160; 528/295; 528/301; 528/305

[58] Field of Search ............... 523/160, 161; 106/31.6; 528/295, 301, 302, 305

[56] References Cited

U.S. PATENT DOCUMENTS

| | | | |
|---|---|---|---|
| 3,563,942 | 2/1971 | Heiberger et al. | 260/29.2 |
| 4,257,928 | 3/1981 | Vachon et al. | 260/33.4 R |
| 4,912,157 | 3/1990 | Clark et al. | 524/265 |
| 4,921,764 | 5/1990 | Rudd et al. | 428/480 |
| 5,006,598 | 4/1991 | Adams et al. | 524/601 |
| 5,021,544 | 6/1991 | Padget et al. | 528/272 |
| 5,563,223 | 10/1996 | Tachika et al. | 525/437 |
| 5,651,813 | 7/1997 | Santilli et al. | 106/31.67 |
| 5,762,695 | 6/1998 | Wong et al. | 106/31.89 |
| 5,837,044 | 11/1998 | Santilli et al. | 106/31.67 |
| 5,837,754 | 11/1998 | Shimomura et al. | 523/161 |
| 5,877,235 | 3/1999 | Sakuma et al. | 523/161 |
| 5,939,355 | 8/1999 | Burns et al. | 503/227 |

*Primary Examiner*—Vasu Jagannathan
*Assistant Examiner*—Callie E. Shosho
*Attorney, Agent, or Firm*—Harold E. Cole

[57] ABSTRACT

An ink jet ink composition comprising from about 0.5% to about 30% by weight of a pigment, a carrier and a sulfonated polyester dispersant in a ratio of dispersant:pigment from about 0.1:1 to about 5:1.

16 Claims, No Drawings

DISPERSANT FOR INK JET INK

FIELD OF THE INVENTION

This invention relates to a dispersant for a pigmented ink jet ink.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor lightfastness. When water is used as the carrier, such inks also generally suffer from poor water fastness.

In pigment-based inks, the colorant exists as discrete particles. These pigment particles are usually treated with addenda known as dispersants or stabilizers which serve to keep the pigment particles from agglomerating and settling out of the carrier. Water-based pigmented inks are prepared by incorporating the pigment in the continuous water phase by a milling and dispersing process. Pigmented inks require a water soluble dispersant in the pigment slurry during the milling process. Such a dispersant is necessary to produce a colloidally stable mixture and an ink that can be "jetted" reliably without clogging the print head nozzles.

Dispersing agents in an ink jet ink have the dual function of helping to break down pigments to sub-micron size during the milling process and of keeping the colloidal dispersion stable and free from flocculation for a long period of time. In general, dispersions suffer from poor colloidal stability due to particle agglomeration and/or sedimentation, thus limiting the usefulness of the dispersions in inks.

Although a wide variety of dispersing agents are known for pigmented ink jet inks, they are not without certain problems. For example, many dispersing agents are very selective as far as being able to disperse pigments to sub-micron size. In many instances, each class of pigments may require a specific dispersing agent. Another problem encountered with some polymeric dispersing agents is that they tend to impart an undesirably high viscosity to the resulting inks. Yet another problem with many commercially available dispersants is that they yield dispersions with very low surface tensions. Thus, there is a continuing need for improved dispersing agents for pigmented inks.

DESCRIPTION OF RELATED ART

U.S. Pat. No. 5,651,813 discloses the use of sodium N-methyl-N-oleoyl taurate dispersants in ink jet pigmented inks. However, there is a problem with these dispersants in that they produce dispersions which have a low surface tension. It would be desirable to produce a pigment dispersion with a high surface tension so the ink formulator can have flexibility to reduce it if necessary by the addition of a surfactant. (An ink with a low surface tension cannot be modified upwards.) Having the proper surface tension for an ink is desirable for better ink/paper interactions. Further, it is sometimes desirable to have inks with different surface tensions, e.g., better image quality is obtained if the black ink has a higher surface tension than the cyan, magenta and yellow inks.

It would also be desirable to produce pigment dispersions with a low particle size in order to obtain better covering power and which would have less tendency to clog the ink jet nozzles.

It is an object of this invention to provide a dispersant for a pigmented ink jet ink which will enable the particle size of the dispersed pigment to be lower than that obtained using prior art dispersants. It is another object of this invention to provide a dispersant for an ink jet ink which will enable the surface tension of the ink to be higher than that of the prior art.

SUMMARY OF THE INVENTION

These and other objects are achieved in accordance with this invention which relates to an ink jet ink composition comprising from about 0.5% to about 30% by weight of a pigment, a carrier and a sulfonated polyester dispersant in a ratio of dispersant:pigment from about 0.1:1 to about 5:1.

Another embodiment of the invention relates to an ink jet printing method, comprising the steps of:

A) providing an ink jet printer that is responsive to digital data signals;

B) loading the printer with ink-receptive substrates;

C) loading the printer with the above ink jet ink composition; and

D) printing on an ink-receptive element using the ink jet ink in response to the digital data signals.

The dispersing agents used in accordance with the invention are highly effective in reducing pigment particles to much less than one $\mu$m in size during the milling process. These dispersions also exhibit high surface tension, which is beneficial when used in inkjet inks. These dispersions are also characterized by excellent colloidal stability, lack of flocculation and/or sedimentation. Finally, these dispersing agents are useful with a wide variety of pigments.

DETAILED DESCRIPTION OF THE INVENTION

Any sulfonated polyester may be used in the invention provided it produces the desired results. In a preferred embodiment of the invention, the sulfonated polyester dispersant has the following formula:

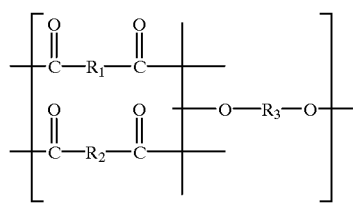

wherein $R_1$ comprises from 0 to 30 mole percent of the polymer and is an alkylene group having from about 2 to about 10 carbon atoms such as ethylene, propylene, butylene, 2,2-dimethylpropylene, etc.; a cycloalkylene group having from about 4 to about 10 carbon atoms such as 1,3-cyclopentylene, 1,4-cyclohexylene, 2-methyl-1,4-cyclohexylene, etc.; or a phenylene group having from about 6 to about 10 carbon atoms such as 1,2-phenylene, 1,3-phenylene 1,4-phenylene, 1,3-tolylene, 1,4-xylene, etc.;

$R_2$ comprises from 20 to 50 mole percent of the polyester and is a sulphonated alkylene group such as 2-sulfoethylene; a sulphonated cycloalkylene group such as 5-sulfo-1,3-cyclohexylene; or a sulfonated phenylene group such as 5-sulfo-1,3-phenylene; and $R_3$ comprises 50 mole percent of the polyester and is an alkylene group having from about 2 to about 30 carbon atoms, such as ethylene, propylene, hexylene, decylene, etc.; a cycloalkylene group such as cyclohexylene or tricyclodecanedimethylene; an oxyalkylene group such as 3-oxapentylene, 3,6,9,12,15-pentaoxaheptadecylene, or 2,5-dimethyl-3-oxapentylene; or a polyoxyalkylene group such as polyoxyethylene or polyoxypropylene.

In a preferred embodiment of the invention, $R_1$ in the above formula is 1,4-cyclohexylene or 1,3-phenylene. In another preferred embodiment, $R_1$ is 0, $R_2$ is 50 mole percent and $R_3$ is 50 mole percent. In yet another preferred embodiment, $R_2$ is 5-sulfo-1,3-phenylene. In still another preferred embodiment, $R_3$ is decylene.

Examples of sulfonated polyester dispersants useful in the invention include the following:

TABLE 1

| Polyester Dispersant | Composition | $T_g$ (° C.) |
|---|---|---|
| P-1 | 15 mole % sodium sulfoisophthalic acid<br>35 mole % isophthalic acid<br>50 mole % diethylene glycol | 41 |
| P-2 | 25 mole % sodium 5-suphoisophthalic acid<br>25 mole % dimethylcyclohexanedicarboxylate<br>25 mole % cyclohexanedimethanol<br>25 mole % decanediol | 120 |
| P-3 | 20 mole % sodium sulfoisophthalic acid<br>30 mole % sebacic acid<br>10 mole % diethyleneglycol<br>40 mole % 1,4-cyclohexanedimethanol | —* |
| P-4 | 25 mole % sodium sulfoisophthalic acid<br>25 mole % sulfoisophalic acid<br>40 mole % diethyleneglycol<br>10 mole % decanediol | 41 |
| P-5 | 35 mole % sodium sulfoisophthalic acid<br>15 mole % isophthalic acid<br>30 mole % diethylene glycol<br>10 mole % decanediol<br>10 mole % 1,4-cyclohexanedicarboxylate | —* |
| P-6 | 20 mole % sodium sulfoisophthalic acid<br>30 mole % 1,4-cyclohexanedicarboylic acid<br>50 mole % decanediol | −23 |
| P-7 | 30 mole % sodium sulfoisophthalic acid<br>20 mole % 1,4-cyclohexanedicarboxylic acid<br>10 mole % diethyletheneglycol<br>40 mole % 1,4-cyclohexanedimethanol | —* |
| P-8 | 50 mole % sodium sulfoisophthalic acid<br>30 mole % decanediol<br>20 mole % 1,4-cyclohexanedimethanol | 180 |
| P-9 | 30 mole % sodium sulfoisophthalic acid<br>20 mole % sebacic acid<br>40 mole % diethyleneglycol<br>10 mole % decanediol | 38 |
| P-10 | 40 mole % sodium sulfoisophthalic acid<br>10 mole % sebacic acid<br>25 mole % decanediol<br>25 mole % 1,4-cyclohexanedimethanol | 40 |

*No Tg was detected for this material between 25 and 250° C.

As noted above, the ink jet ink composition of the invention contains a sulfonated polyester dispersant in a ratio of dispersant:pigment from about 0.1:1 to about 5:1. In a preferred embodiment, the ratio of dispersant:pigment is from about 0.25:1 to about 2.5:1.

In the present invention, any of the known organic pigments can be used. Pigments can be selected from those disclosed, for example, in U.S. Pat. Nos. 5,026,427; 5,085,698; 5,141,556; 5,160,370 and 5,169,436. The exact choice of pigment will depend upon the specific color reproduction and image stability requirements of the printer and application. For four-color printers combination of cyan, magenta, yellow, and black (CMYK) pigments should be used. An exemplary four color set may be copper phthalocyanine (pigment blue 15), quinacridone magenta (pigment red 122), paliotol Yellow D0960HD (pigment yellow 138) and carbon black (pigment black 7). In a preferred embodiment of the invention, the pigment has a particle size of from about 10 nanometers to about 1000 nanometers.

As noted above, the ink jet ink composition of the invention comprises from about 0.5% to about 30% by weight of a pigment. In a preferred embodiment of the invention, the ink composition comprises from about 1% to about 5% by weight of the pigment.

The carrier employed in the invention can be water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

Ink Preparation

A preferred method for making the inks of the invention is disclosed in U.S. Pat. No. 5,679,138, the disclosure of which is hereby incorporated by reference. In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, preferably approximately 1.0 to 5%, by weight of the total ink composition for most thermal ink jet printing applications. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have a pH in the range of 5 to 9. Anionic and cationic surfactants may be used in the invention as disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosity's are no greater than 20 centipoise, and preferably in the range of about 1.0 to about 10.0, preferably 1.0 to 5.0 centipoise at room temperature.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant (0–20 wt. %) is added to help prevent the ink from drying out or crusting in the orifices of the printhead. A preferred humectant for the inks of the present invention is a mixture of glycerol and diethylene glycol at a final concentration of between 5 and 20 wt. %. A penetrant (0–10 wt. %) is added to help the ink penetrate the receiving substrate, especially when the substrate is a highly sized paper. A preferred penetrant for the inks of the present invention is n-propanol at a final concentration of 1–6 wt. %. A biocide (0.01–1.0 wt. %) may be added to prevent unwanted microbial growth which may occur in the ink over time. A preferred biocide for the inks of the present invention is Proxel® GXL (obtained from Zeneca Colours Co.) at a final concentration of 0.05–0.5 wt. %. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers Ink-receptive substrates useful in ink jet printing are well known to those skilled in the art. Representative examples of such substrates are disclosed in U.S. Pat. Nos. 5,605,750; 5,723,211; and 5,789,070 and EP 813 978 A1, the disclosures of which are hereby incorporated by reference.

Commercially available ink jet printers use several different schemes to control the deposition of the ink droplets. Such schemes are generally of two types: continuos stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLES

Example 1. Synthesis of P-1.

0.15 moles sodium dimethyl-5-sulfoisophthalate (44.2 g), 0.35 moles dimethylisophthalate (68.02 g) and 0.50 moles diethylene glycol (53.1 g) were weighed into a 250 mL round-bottom, long-necked flask. A take-off arm was attached to the top of the flask. Under a nitrogen stream the monomers were first melted at 200° C., then the molten monomers were purged with nitrogen. Antimony pentoxide, 0.5 mL of a 6% dispersion in ethylene glycol was added. Five drops of neat titanium isopropoxide were added, and the resulting methanol distillate was collected. After two hours, the temperature was increased to 250° C., a vacuum manifold and a stir paddle were attached to the flask, and vacuum applied with stirring. The reaction continued for two hours under vacuum. The flask was then allowed to cool to room temperature for 30 minutes, before the vacuum was released. Polymers were isolated by freezing the flasks in liquid nitrogen and breaking the flask. The resultant polymer had a Tg of 41° C.

Synthesis of Polymers P-2 through P-10 were carried out in the same way as the synthesis of P-1, except that monomers indicated in the above Table 1 were used, and except that when no isophthalic acid groups were present the entire reaction was carried out at 250° C.

Example 2: Control CM-1

A prior art dispersant, sodium N-methyl-N-oleoyl taurate (U.S. Pat. No. 5,651,813) was used to prepare a dispersion of an ink jet ink. The materials are listed in Table 2.

The above components were milled in a 1 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 μm KIMAX® Buchner Funnel obtained from VWR Scientific Products. Particle size distributions were obtained on diluted millgrind samples (about 50:1) using a Leeds & Northrop Ultrafine Particle Analyzer (UPA). The results are listed as a 50% median value. Surface tension measurements were taken using a KRUSS Digital Tensiometer model K10T.

Milling of comparison dispersants were carried out in the same way as above using the dispersants listed in the following Table 2 and the measurements were made as above. The comparison dispersants are similar in chemical composition to the dispersants used in the invention.

TABLE 2

| Dispersant | Composition | Milling Time (hrs.) | Particle Size (nm) | Surface Tension (dynes/cm) |
|---|---|---|---|---|
| C-1 (Control) | Polymeric beads-mean diameter 50 μm (162.5 g) Cyan Pigment - Bis(phthalocyanyl-alumino)tetra-Phenyldisiloxane (17.5 g) Oleoyl methyl taurine, sodium salt (10.5 g) De-ionized water (97.0 g) Proxel ® GXL biocide (Zeneca Corp.) (0.1 g) | 8 | 12.7 | 36.8 |
| C-2 (Comparison) | Polymeric beads Cyan Pigment (10.0 g) Eastman Chemicals AQ-29 polymer (30% active) (50.0 g) Poly(isophthalate diethylene glycol-co-5-sulfoisophthalate diethylene glycol, 90/10 mole ratio) De-ionized water (65.0 g) Proxel ® GXL (0.1 g) | 6 | 490* | ** |
| C-3 (Comparison) | Polymeric beads Cyan Pigment (10.0 g) Triton ® X-200 (15.0 g) De-ionized water (100.0 g) Proxel ® GXL (0.1 g) | 10 | 140 | 29.5 |
| C-4 (Comparison) | Polymeric beads Cyan Pigment (10.0 g) Triton ® X-770 (42 wt. % active) (35.7 g) De-ionized water (79.3 g) Proxel ® GXL (0.1 g) | 8 | 163 | 28.0 |
| C-5 (Comparison) | Polymeric beads Cyan Pigment (10.0 g) Poly(2-acrylamido-2-methyl-propane-sulfonic acid, sodium salt), 45/55 mole ratio 17.4 wt. % active) (86.2 g) De-ionized water (28.8 g) Proxel ® GXL (0.1 g) | 8 | 3764 | *** |
| C-6 (Comparison) | Polymeric beads Cyan Pigment (10.0 g) Napthalenesulfonic acid sodium salt (15.0 g) De-ionized water (100.0 g) Proxel ® GXL (0.1 g) | 4 | 581* | ** |

*Particle size sample taken prior to filtering
**Unable to read-did not filter
***Unable to read-dispersion too viscous Milling of the dispersants used in accordance with the invention were carried out in the same way as above using the dispersants listed in the following Table 3 and the measurements were made as above:

TABLE 3

| Dispersant | Composition | Milling Time (hrs.) | Particle Size (nm) | Surface Tension (dynes/cm) |
|---|---|---|---|---|
| I-1 | Polymeric beads Pigment Yellow 74 (10 g) Polymer P-2 (31 wt. % active) (32.3 g) De-ionized water (82.7 g) Proxel ® GXL (0.1 g) | 5 | 11.3 | 41.8 |
| I-2 | Polymeric beads Cyan Pigment (10.0 g) Polymer P-2 (19.5 wt. % active) (25.6 g) De-ionized water (89.4 g) Proxel ® GXL (0.1 g) | 6 | 19.0 | 58.5 |
| I-3 | Polymeric beads Cyan pigment (10.0 g) Polymer P-2 (19.5 wt. % active) (51.3 g) De-ionized water (63.7 g) Proxel ® GXL (0.1 g) | 6 | 19.0 | 52.1 |
| I-4 | Polymeric beads Cyan pigment (10.0 g) Polymer P-2 (19.5 wt. % active) (76.9 g) De-ionized water (38.1 g) Proxel ® GXL (0.1 g) | 6 | 20.0 | 49.2 |
| I-5 | Polymeric beads Pigment Red 122 (10.0 g) Polymer P-2 (19.5 wt. % active) (25.6 g) De-ionized water (89.4 g) Proxel ® GXL (0.1 g) | 3 | 17.2 | 55.7 |
| I-6 | Polymeric beads Pigment Red 122 (10.0 g) Polymer P-2 (19.5 wt. % | 4 | 20.9 | 48.4 |

TABLE 3-continued

| Dispersant | Composition | Milling Time (hrs.) | Particle Size (nm) | Surface Tension (dynes/cm) |
|---|---|---|---|---|
| | active) (66.7 g) De-ionized water (48.3 g) Proxel ® GXL (0.1 g) | | | |
| I-7 | Polymeric beads Cyan pigment (10.0 g) Polymer P-1 (19.7 wt. % active) (76.1 g) De-ionized water (38.9 g) Proxel ® GXL (0.1 g) | 14 | 143 | 52.3 |
| I-8 | Polymeric beads Cyan pigment (10.0 g) Polymer P-6 (15.1 wt. % active) (99.3 g) De-ionized water (15.7) g Proxel ® GXL (0.1 g) | 14 | 200 | 47.7 |
| I-9 | Polymeric beads Cyan pigment (10.0 g) Polymer P-4 (20.7 wt. % active) (72.5 g) De-ionized water (42.54 g) Proxel ® GXL (0.1 g) | 14 | 25 | 50.0 |
| I-10 | Polymeric beads Cyan pigment (10.0 g) Polymer P-7 (19.7 wt. % active) (76.1 g) De-ionized water (38.9 g) Proxel ® GXL (0.1 g) | 10 | 19.5 | 53.9 |
| I-11 | Polymeric beads Cyan pigment (10.0 g) Polymer P-5 (20.2 wt. % active) (74.3 g) De-ionized water (40.7 g) Proxel ® GXL (0.1 g) | 10 | 232 | 48.3 |
| I-12 | Polymeric beads Cyan pigment (10.0 g) Polymer P-8 (20.4 wt. % active) (73.5 g) De-ionized water (41.5 g) Proxel ® GXL (0.1 g) | 4 | 22 | 46.7 |
| I-13 | Polymeric beads Cyan pigment (10.0 g) Polymer P-3 (18.3 wt. % active) (82.0 g) De-ionized water (33.0 g) Proxel ® GXL (0.1 g) | 4 | 23.4 | 49.0 |
| I-14 | Polymeric beads Cyan pigment (10.0 g) Polymer P-9 (19.9 wt. % active) (75.4 g) De-ionized water (39.6 g) Proxel ® GXL (0.1 g) | 6 | 24.2 | 45.7 |
| I-15 | Polymeric beads Cyan pigment (10.0 g) Polymer P-10 (19.6 wt. % active) (76.5 g) De-ionized water (38.5 g) Proxel ® GXL (0.1 g) | 4 | 17.2 | 44.5 |

The above results indicate that the particles size of a dispersed pigment in an ink jet ink using the dispersants in accordance with the invention were generally lower than the prior art dispersants. In addition, the surface tension of the inks prepared in accordance with the invention were always higher than the prior art inks.

The invention has been described in detail with particular reference to certain preferred embodiments thereof, but it will be understood that variations and modifications can be effected within the spirit and scope of the invention.

What is claimed is:

1. An ink jet ink composition comprising from about 0.5% to about 30% by weight of a pigment, a carrier and a sulfonated polyester dispersant in a ratio of dispersant:pigment from about 0.1:1 to about 5:1, said sulfonated polyester dispersant having the formula:

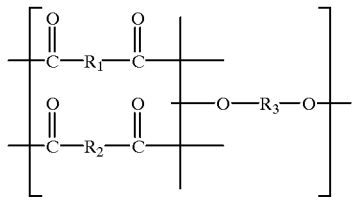

wherein $R_1$ comprises from 0 to 30 mole percent of the polymer and is an alkylene group having from about 2 to about 10 carbon atoms; a cycloalkylene group having from about 4 to about 10 carbon atoms; or a phenylene group having from about 6 to about 10 carbon atoms;

$R_2$ comprises from 20 to 50 mole percent of the polyester and is a sulphonated alkylene group; a sulphonated cycloalkylene group; or a sulfonate phenylene group; and $R_3$ comprises 50 mole percent of the polyester and is an alkylene group having from about 2 to about 30 carbon atoms; a cycloalkylene group; an oxyalkylene group; or a polyoxyalkylene group.

2. The composition of claim 1 wherein $R_1$ is 0, $R_2$ is 50 mole percent and $R_3$ is 50 mole percent.

3. The composition of claim 1 wherein $R_1$ is 1,4-cyclohexylene or 1,3-phenylene.

4. The composition of claim 1 wherein $R_2$ is 5-sulfo-1,3-phenylene.

5. The composition of claim 1 wherein $R_3$ is decylene.

6. The composition of claim 1 wherein said carrier is water.

7. The composition of claim 1 comprising from about 1% to about 5% by weight of said pigment.

8. The composition of claim 1 wherein said sulfonated polyester dispersant is present in a ratio of dispersant:pigment from about 0.25:1 to about 2.5:1.

9. An ink jet printing method, comprising the steps of:

A) providing an ink jet printer that is responsive to digital data signals;

B) loading said printer with ink-receptive substrates;

C) loading said printer with an ink jet ink composition comprising from about 0.5% to about 30% by weight of a pigment, a carrier and a sulfonated polyester dispersant in a ratio of dispersant:pigment from about 0.1:1 to about 5:1; and D) printing on an ink-receptive substrate using said ink jet ink in response to said digital data signals, said sulfonated polyester dispersant having the formula:

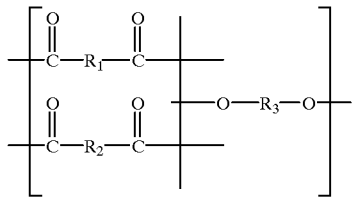

wherein $R_1$ comprises from 0 to 30 mole percent of the polymer and is an alkylene group having from about 2 to about 10 carbon atoms; a cycloalkylene group having from about 4 to about 10 carbon atoms; or a phenylene group having from about 6 to about 10 carbon atoms;

$R_2$ comprises from 20 to 50 mole percent of the polyester and is a sulphonated alkylene group; a sulphonated cycloalkylene group; or a sulfonated phenylene group; and $R_3$ comprises 50 mole percent of the polyester and is an alkylene group having from about 2 to about 30 carbon atoms; a cycloalkylene group; an oxyalkylene group; or a polyoxyalkylene group.

10. The method of claim 9 wherein $R_1$ is 0, $R_2$ is 50 mole percent and $R_3$ is 50 mole percent.

11. The method of claim 9 wherein $R_1$ is 1,4-cyclohexylene or 1,3-phenylene.

12. The method of claim 9 wherein $R_2$ is 5-sulfo-1,3-phenylene.

13. The method of claim 9 wherein $R_3$ is decylene.

14. The method of claim 9 wherein said carrier is water.

15. The method of claim 9 comprising from about 1% to about 5% by weight of said pigment.

16. The method of claim 9 wherein said sulfonated polyester dispersant is present in a ratio of dispersant:pigment from about 0.25:1 to about 2.5:1.

* * * * *